United States Patent [19]

Hrvatin

[11] Patent Number: 5,362,108
[45] Date of Patent: Nov. 8, 1994

[54] AUTOMATIC PALLET FLUID COUPLER

[75] Inventor: Scott Hrvatin, Mason, Ohio

[73] Assignee: LeBlond Makino Machine Tool Co., Mason, Ohio

[21] Appl. No.: 988,741

[22] Filed: Dec. 10, 1992

[51] Int. Cl.⁵ .............................................. F16L 35/00
[52] U.S. Cl. ........................................ 285/24; 285/29; 285/93; 285/316; 269/309
[58] Field of Search ..................... 285/26, 27, 93, 315, 285/316, 137.1, 1; 269/309

[56] References Cited

U.S. PATENT DOCUMENTS

| | | | |
|---|---|---|---|
| 2,511,765 | 6/1950 | Bradbury | 285/1 |
| 3,386,754 | 6/1968 | Morrison | 285/316 X |
| 3,527,480 | 9/1970 | Larson | 285/316 X |
| 3,684,321 | 8/1972 | Hundhausen | 285/316 |
| 4,485,845 | 12/1984 | Brady | 285/316 X |
| 4,615,546 | 10/1986 | Nash et al. | 285/26 |

FOREIGN PATENT DOCUMENTS 4157287  5/1992  Japan ..................................... 285/26

OTHER PUBLICATIONS

Catalog, "Hydraulic Power Workholding Systems", ®1991 Power Team Division, SPX Corporation, Owatonna, Minn. 55060.

"Auto Coupler System Setup and Operation Procedures", Coupler System UMTW86VI, Universal Machine & Tool Works, Inc., Jun. 3, 1990.

Primary Examiner—Dave W. Arola
Attorney, Agent, or Firm—Wood, Herron & Evans

[57] ABSTRACT

An passive automatic fluid coupler mechanism utilizes the relative motion between a pallet and a pallet support to operate a self-locking, quick disconnect coupling thereby connecting and disconnecting a fluid path between the pallet and the rotating table.

13 Claims, 5 Drawing Sheets

AUTOMATIC PALLET FLUID COUPLER

BACKGROUND OF THE INVENTION

1. Field of the Invention

The invention relates to an automatic fluid coupler, and more particularly, to a passive coupler mechanism for automatically connecting and disconnecting a fluid coupling between a movable pallet and a pallet support in response only to relative motion between the pallet and pallet support.

2. Description of the Related Art

In many manufacturing environments, one or more parts to be processed are loaded onto a movable pallet or fixture on a pallet at a load station. It is common for the parts to be secured to the fixtures or the pallet by means of clamping mechanisms which utilize pneumatic or hydraulic actuators such as a piston and cylinder. Therefore, it is necessary that the pallet have access to a source of fluid power. Typically, the fluid source is remote from the pallet and is supplied to the pallet by hoses terminating with quick disconnect couplings which are automatically or manually connected to the pallet at the load station. After the parts are loaded on the pallet, pressurized hydraulic fluid is applied from the fluid source to operate clamps thereby locking the parts in position. The pressure is maintained by blocking valves, and the fluid supply is disconnected from the pallet. Thereafter, the pallet is moved to a machining station, and the clamps under the fluid pressure hold the parts in position during machining. When the machining process is completed, the pallet is moved back to the load station, the source of fluid is connected to the pallet; and clamps are depressurized, thereby permitting the finished parts to be unloaded.

The load and machining stations may both be located at the machine, and the pallet is simply shuttled therebetween. Alternatively, two pallets may be used, and pans are unloaded and loaded from one pallet located at the load station while the second pallet is located at the machining station. The pallets are then rotated between the machining and load stations. In other environments, the pallet may be loaded and unloaded at a part load station remote from the machine; and the pallet is then transported from the remote load station to a station at the machine.

In order to couple the fluid source to the pallet, a pair of fluid coupling members, typically male members, are located on a side surface of the pallet. A pair of mating female fluid coupling members are connected via hosing to the fluid pressure and return lines of a fluid source. After the pallet is located at the load station, the couplings may be manually connected and disconnected. If a powered automatic coupler is used, a powered slide containing a first pair of coupling members is located adjacent the side of the pallet containing the mating the pair of coupling members. A logic controller associated with the coupler executes a couple and unclamp cycle which automatically moves the slide with the first coupling members to an engagement position with respect to the mating coupling members mounted on the pallet. When in the engaged position, the fluid couplings are made, or connected, and the clamps may be manually or automatically released.

With some designs, the automatic coupler secures the couplings by physically holding the coupling members together. With other designs, the automatic coupler uses self-locking, quick disconnect couplings; and an actuator operates sliding collars on the pair of female couplings which is mounted on the powered slide. By controlling the operation of the actuator in conjunction with motion of the powered slide, the couplings are disconnected; and the powered slide is moved back to its original position away from the pallet.

With the clamps released, the operator may move the pallet to various positions to unload and load workpieces therefrom. After all the workpieces have been exchanged, the pallet is oriented to position the side with the pair of male coupling members adjacent the powered automatic coupler. The powered slide moves the pair of female coupling members to the engagement position thereby connecting the fluid path. The clamps are automatically or manually engaged, the couplings are released and powered slide is retracted from the pallet. The above described system has a disadvantage of requiring very accurate positioning of the automatic coupler relative to the pallet because the coupling members have limited compliance to compensate for a positioning misalignment therebetween. Using the coupling members as an aligning mechanism produces excessive wear on the coupling faces and may also result in the coupling unit binding as the coupling members attempt to force themselves into alignment. The above automatic system has a further disadvantage in that the coupling members mounted on the side of the pallet are exposed to chips and contamination from the machining environment.

SUMMARY OF THE INVENTION

To overcome the disadvantages of existing automatic fluid couplers, a primary object of the present invention is to provide an automatic fluid coupler between a pallet and pallet support which automatically connects and disconnects a self-locking quick disconnect coupling utilizing only the motion of the pallet with respect to the pallet support.

According to the principles of the present invention, an automatic coupler operates with a self-locking quick disconnect coupling which has first and second coupling members located on first and second machine elements, respectively. A yoke is connected to and follows the motion of a locking collar slidably mounted on the second coupling member. A yoke stop is connected to the second machine element and is disposed with respect to the yoke to permit the locking collar to move into its locking position with respect to the second coupling member in response to the first machine element moving the first coupling member in a first direction to engage the second coupling member, thereby connecting the fluid path. However, the yoke stop blocks motion of the yoke in the opposite direction. Therefore, when the first machine element moves the locked coupling members in the opposite direction, the yoke stop holds the locking collar stationary; and the coupling members move relative to the locking collar. Continued motion of the coupling members in the opposite direction moves the second coupling member to a release position relative to the locking collar which unlocks the coupling members and disconnects the fluid path.

The second coupling member and yoke are mounted on a sliding block which permits adjustment of the position at which the coupling locks with respect to the engaged position of the first and second machine elements. The sliding block is supported on springs so that the fluid coupler operation is independent of the pallet and pallet support coupling operation. The apparatus further includes aligning pins and mating guides to bring the coupling members into alignment prior to engagement thereby minimizing damage to the coupling members. The apparatus further has a proximity switch for sensing the locked position of the locking collar.

The invention has an advantage of providing a passive, simple and reliable automatic coupler mechanism that does not require a separate actuator or control. The present invention utilizes the relative motion between movable machine elements to operate a self-locking quick disconnect fluid coupling.

These and other objects and advantages of the present invention will become more readily apparent during the following detailed description taken in conjunction with the drawings herein.

DETAILED DESCRIPTION

Figure 1:
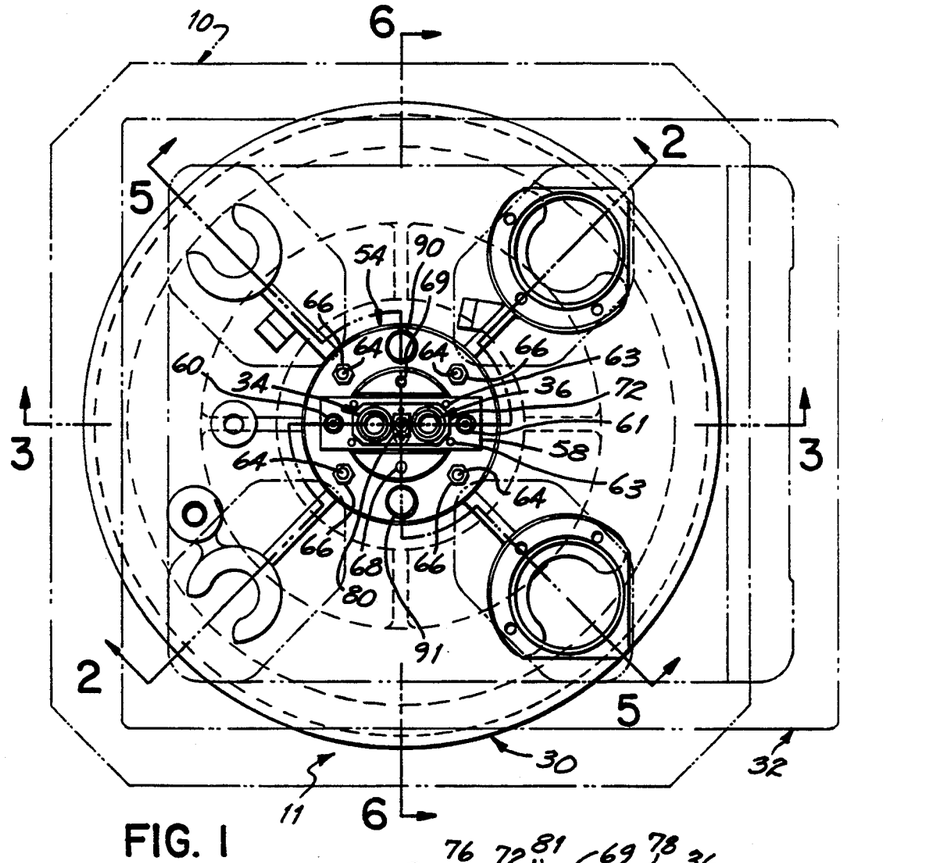
FIG. 1 is a top plan view of a pallet support utilizing the present invention wherein the pallet is shown in phantom.
Figure 2:
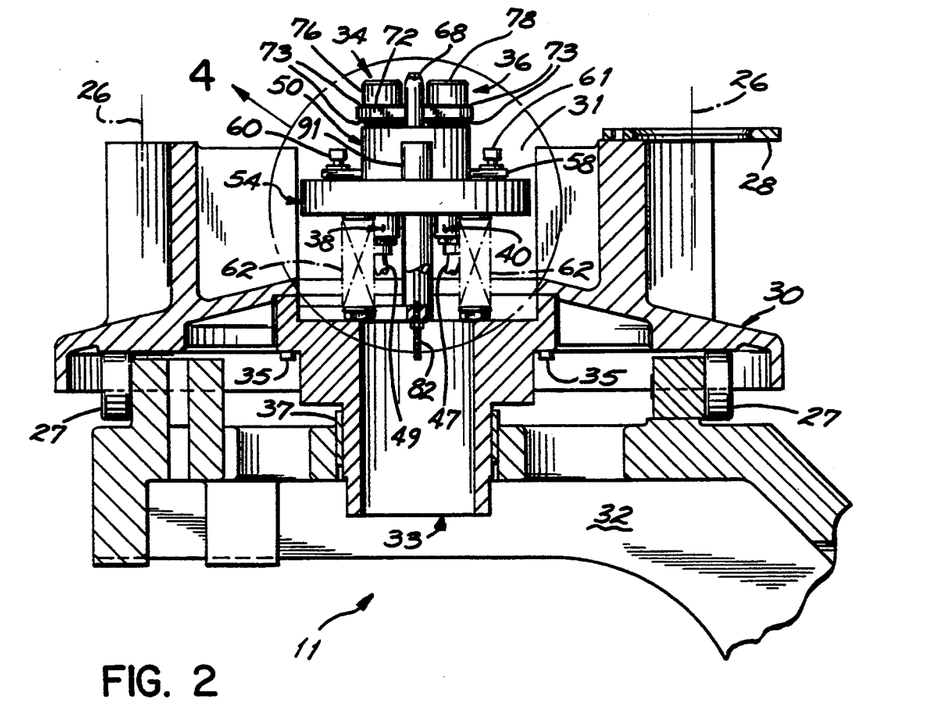
FIG. 2 is a cross-sectional view taken along line 2—2 of FIG. 1.
Figure 3:
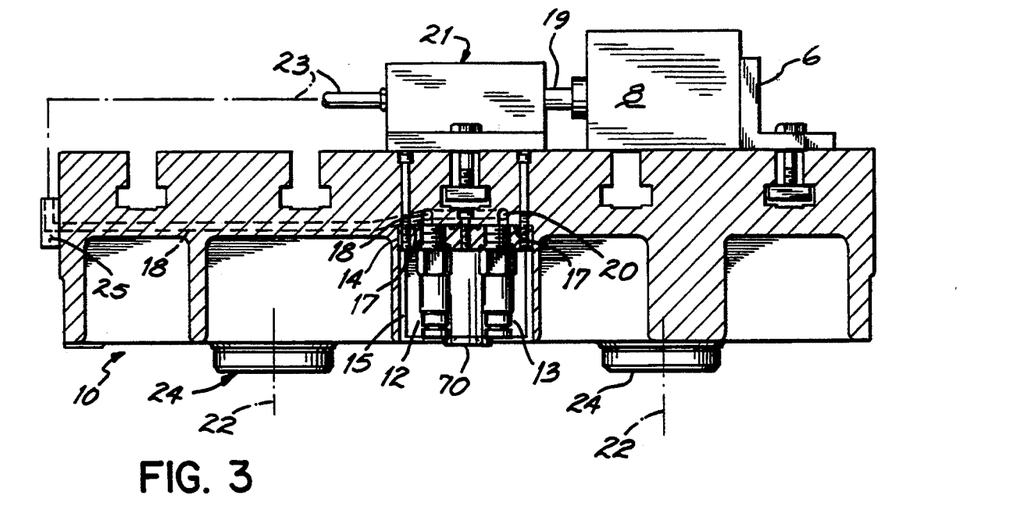
FIG. 3 is a centerline cross-sectional view taken along one side of the pallet as shown by line 3—3 of FIG. 1.
Figure 5:
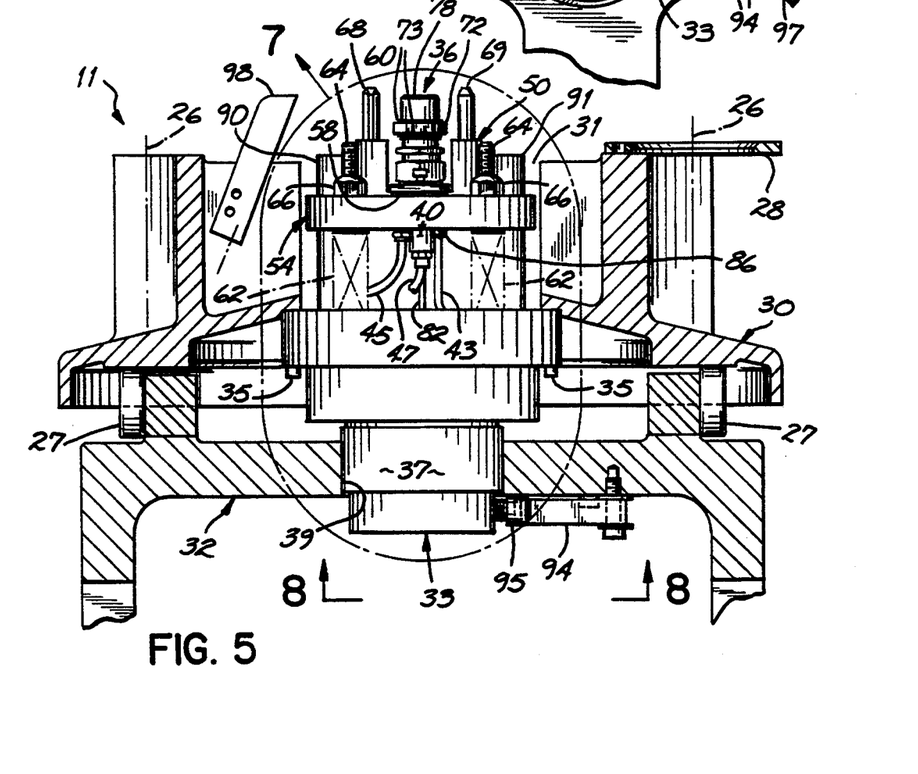
FIG. 5 is a cross-sectional view taken along line 5—5 of FIG. 1.
Figures 6, 8:
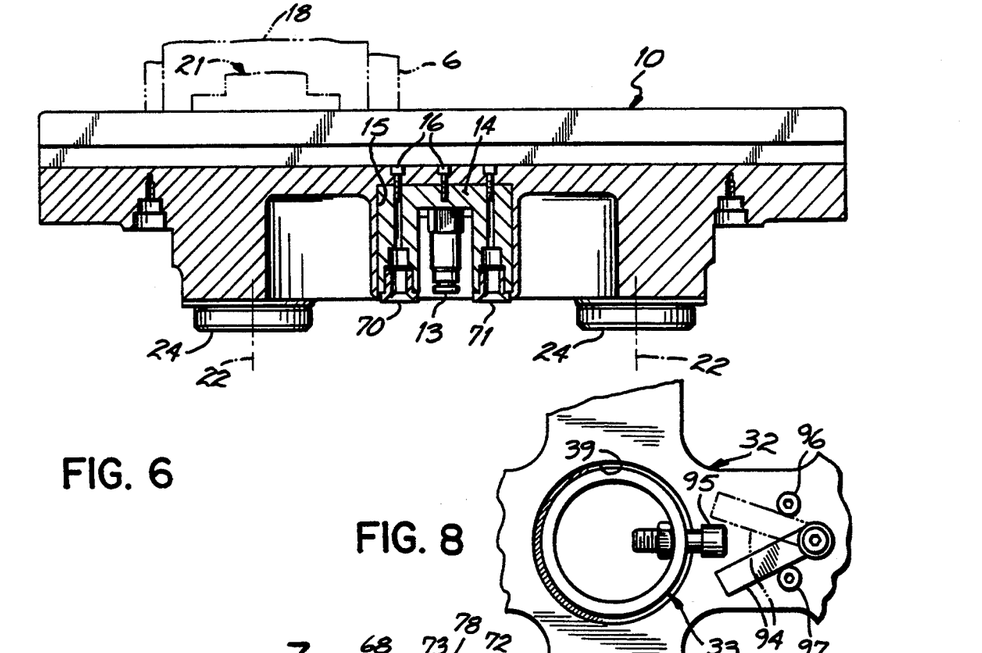
FIG. 6 is a centerline cross-sectional view taken along another side of the pallet as shown by line 6—6 of FIG. 1.
FIG. 8 is a bottom elevational view taken along line 8—8 of FIG. 5.

The operation of the automatic fluid coupler of the present invention will be described with regard to FIGS. 1 through 5. Referring to FIGS. 2 and 3, at a load station 11, a workpiece 8 to be machined is located relative to a fixture 6 secured to a movable pallet 10. The workpiece 8 is clamped against the fixture 6 by means of a piston 19 which is energized by a fluid cylinder 21. Air or hydraulic fluid is supplied to the cylinder by hoses 23 connected to a fluid coupling manifold 25 on a side of the pallet 10. Self-locking, quick disconnect fluid couplings 7 and 9 are comprised of female members 34 and 36, respectively, shown in FIG. 2, and male members 12 and 13, respectively, shown in FIG. 3. As shown in FIGS. 3 and 6, the male members 12 and 13 are threadably connected into a pallet insert 14 which, in turn, is secured within a centrally located recess, or pocket, 15 of the pallet 10 by screws 16. The recess 15 is sized so that the male coupling members are completely contained therein so as not to present an interference during motion of the pallet 10. Fluid paths are provided through the male coupling members 12 and 13 and through drilled passages 18 and 20 to the fluid coupling manifold 25 on the pallet 10. O-rings 17 seal the fluid paths between the pallet insert 14 and the pallet 10.

After being transferred to a position above the load station, the pallet 10 is located such that center lines 22 of the respective pallet bushings 24 are in substantial alignment with the center lines 26 of the respective two locating tings 28. The locating rings 28 are attached to a pallet support such as a table 30 which rotates on rollers 27 with respect to a stationary base 32. The apparatus and process for locating and engaging the pallet 10 onto the rotating table 30, as well as the mechanisms for rotating the table 30 with respect to the base 32, are known in the art and are not part of the present invention.

Figure 7:
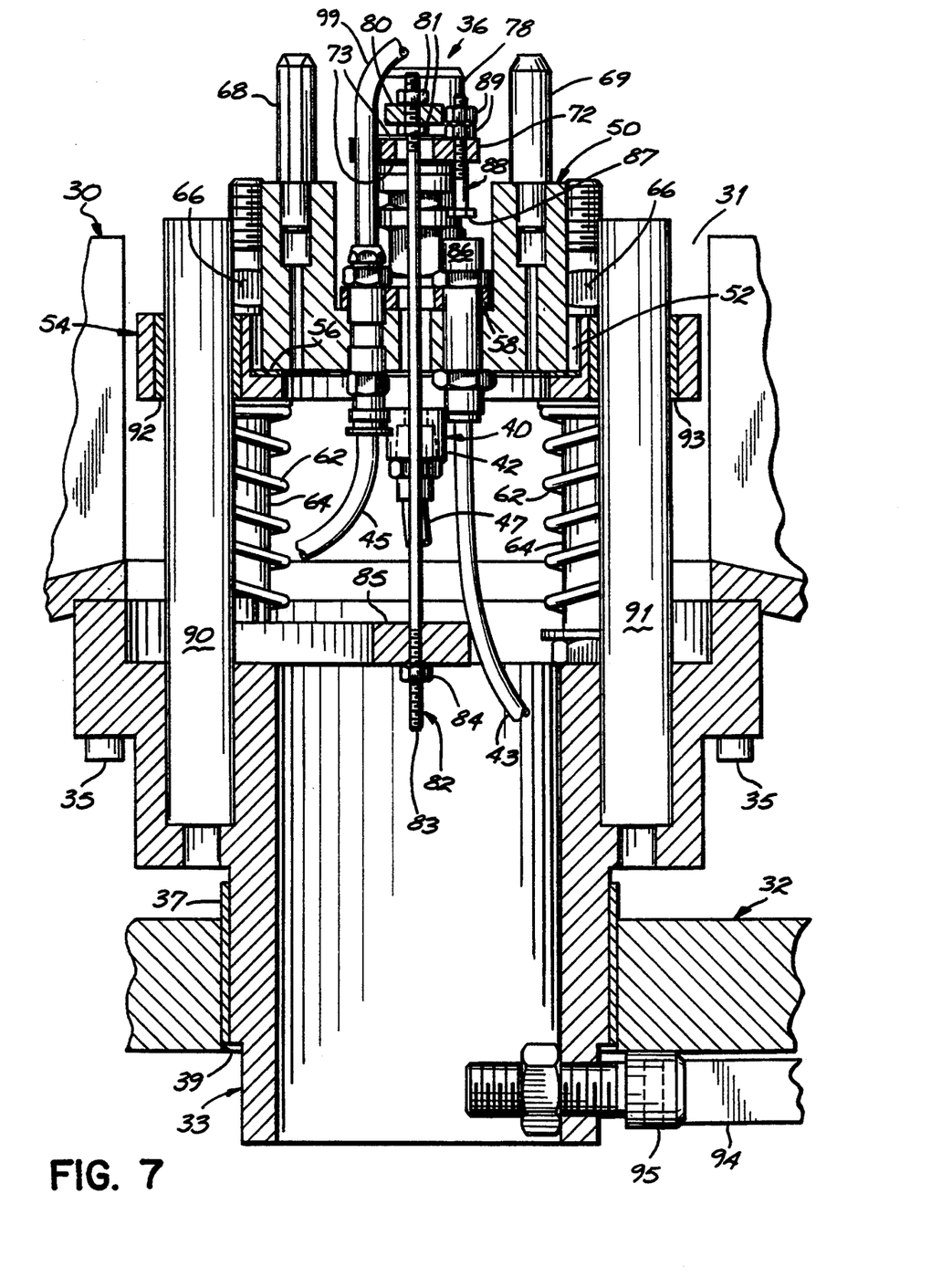
FIG. 7 is a larger cross-sectional view of encircled area 7 of FIG. 5.

As best shown in FIG. 7, the rotating table 30 has a centrally located through-hole 31. A table insert 33 is attached to the through-hole 31 at the bottom of the table 30 by means of screws 35. A cylindrical nylon bushing 37 is located in a center-hole 39 of the stationary base 32. The table insert 33 is slidably and rotatably contained within the bushing 37. The above arrangement provides an unobstructed passage from the through-hole 31 of rotating table 30, through the table insert 33 and through the stationary pallet support, or base, 32. Electrical wires 43 and pneumatic tubing 45 are used to supply electric and pneumatic utilities to the automatic coupler.

Figure 4:
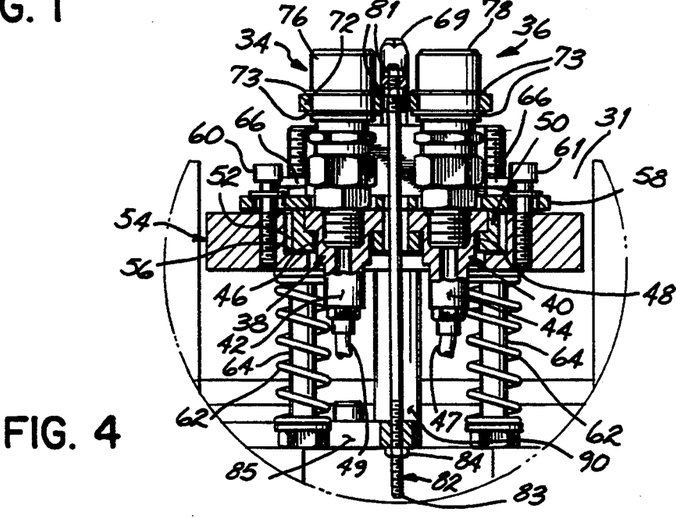
FIG. 4 is a larger cross-sectional view of encircled area 4 of FIG. 2.

Referring to FIGS. 2 and 4, the couplings 7 and 9 also include female coupling members 34 and 36 which are threadably connected to bushings 38 and 40, respectively. The lower ends 42 and 44 of the bushings 38 and 40, respectively, are each adapted to receive couplings from two hydraulic hoses 47 and 49 which through appropriate and well known valving arrangements are selectively connected to pressure and return lines of a hydraulic pump and tank (not shown). Therefore, hydraulic hoses 47 and 49 are selectably pressure and return lines, and either of the hoses 47 and 49 may be selected as a source of fluid while the other hose functions as a fluid return. The bushings 38 and 40 are located within bores 46 and 48 of an aligning block 50. There is approximately 0.4 mm to 0.7 mm of radial clearance between the bushings 38 and 40 and the bores 46 and 48, respectively, to accommodate dimensional variations. The bushings fit freely so that they may individually rotate within their respective bores in the aligning block 50. The aligning block 50 is located within a bore 52 of a sliding block 54 and rests on a nylon washer 56 at the bottom of the bore 52. A retaining plate 58 is secured by screws 63 (FIG. 1) to alignment block 50. The screws 60 and 61 pass through enlarged holes within the retainer plate 58 and are not tightened against retainer plate 58. Therefore, the aligning block 50 and the female coupling members 34 and 36 are able to move and rotate slightly in order to achieve the desired alignment.

Referring to FIG. 7, the sliding block 54 is slidably mounted on guide rods 90 and 91 which have one end rigidly connected to table insert 33. Sleeve bearings 92 and 93 facilitate motion of the sliding block 54 over the guide rods 90 and 91. The sliding block 54 is supported on four springs 62 which are slidably located about four bolts 64. Four nuts 66 threadably attached to the bolts 64, respectively, may be adjusted to vary a predetermined position to which the springs 62 bias the sliding block 54 with respect to the table 30. Two aligning pins 68 and 69 with conical hardened steel tips are rigidly connected to the aligning block 50. Mating guides 70 and 71 (FIG. 6) have tapered openings to receive the aligning pins 68 and 69 thereby guiding the female coupling members 34 and 36 into alignment prior to engagement with male coupling members 12 and 13, respectively. Alignment of the coupling members 34 and 36 is independent of the interaction of the bushing 24 with alignment ring 28 which guide the pallet 10 and table 30 into alignment. The use of the alignment pins 68 and 69 reduces wear and tear on the coupling members which otherwise would have to absorb the forces necessary to provide the proper alignment between the coupling members. Referring to FIG. 7, there is approximately 4 mm of radial clearance between the outside circumference of the aligning block 50 and the circumference of the bore 52. Consequently, the female couplings 34 and 36, their bushings 38 and 40 and the aligning block 50 may move to accommodate misalignment between the aligning pins 68 and 69 and mating guides 70 and 71 upon engagement.

Referring to FIGS. 4 and 7, a yoke 72 is mounted on female coupling members 34 and 36 by means of four retaining rings 73 which are located on both sides of the yoke 72 in grooves (not shown) provided in the locking collars 76 and 78 of the female coupling members 34 an 36, respectively. The yoke 72 moves with, that is, follows the motion of, the collars 76 and 78 of the female coupling members 34 and 36, respectively. A yoke stop 80 is secured by two nuts 81 threaded on one end of a shaft 82 on both sides of the yoke stop 80. The other end 83 of shaft 82 is threaded through a support 85 connected to the table insert 33. The position of the yoke stop 80 may be threadably adjusted with respect to the table insert 33 by turning the rod 82 thereby moving it with respect to support 85. Nut 84 on the other end 83 of the shaft 82 is used to lock the rod 82 with respect to the support 85. The nuts 66 adjust the position of the male and female coupling members longitudinally, or in this application, vertically, so that when the pallet 10 is positioned on the table 30, the coupling members are relatively positioned to allow operation of the locking collars. Rotation of the rod 82 changes the position of the yoke stop 80 with respect to the yoke 72 and allows an adjustment of the point at which motion of the locking collar is inhibited thereby releasing the male coupling members 12 and 13 from the female coupling members 34 and 36, respectively.

A proximity switch 86 of FIG. 7 is used to determine that the locking collars have reached their upward biased position, thereby indicating the coupling members are locked together. The proximity switch 86 is mounted on the aligning block 50 and detects the locked position of the locking collars by detecting the location of a reference surface 87 of a threaded rod, or bolt, 88 threadably engaged to the yoke 72. The position of the threaded rod 88 with respect to the proximity switch 86 may be adjusted, and the rod 88 is locked into place with the nuts 89. The proximity switch 86 is electrically connected to circuits governing the flow of fluid from the fluid source into the coupling members, and the fluid flow is blocked until the proximity switch 86 detects the locked condition of the couplings.

Figure 9A:
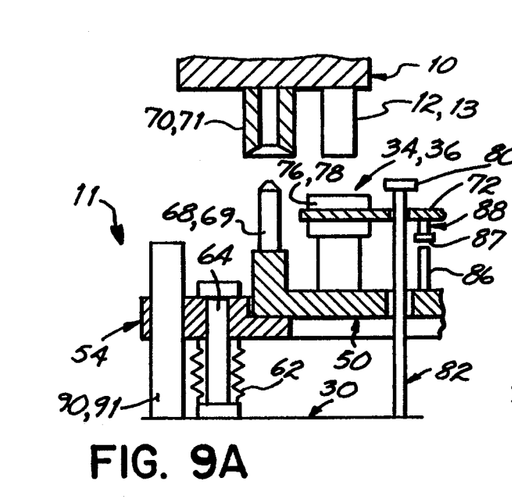
FIGS. 9A–9F are schematic illustrations demonstrating the operation of the automatic coupler.

The operation of the automatic fluid coupler will be described with reference to the schematic diagrams of FIGS. 9A-9F. FIG. 9A illustrates the pallet 10 separated from the table 30. The purpose of the schematic illustrations is to clarify the functional operation of the automatic coupler so that all the functional elements can be easily discussed and shown in one schematic diagram. The spatial relationships between the functional elements previously described with regard to FIGS. 1-7 have been changed in the schematic diagrams of FIG. 9 to facilitate an illustration and discussion of the functional relationships.

As the pallet 10 is moved down with respect to the table 30, the tapered openings of the alignment guides 70, 71 receive the conical tips of the alignment pins 68, 69. As the aligning pins 68, 69 move into alignment with their mating guides 70, 71, the alignment block 50 and female couplings 34, 36 move with the aligning pins. That alignment process effects a coaxial alignment between the male coupling members 12, 13 with the female coupling members 34, 36 and continued motion of the pallet 10 brings the male and female coupling members into engagement as illustrated in FIG. 9B.

Figure 9B:
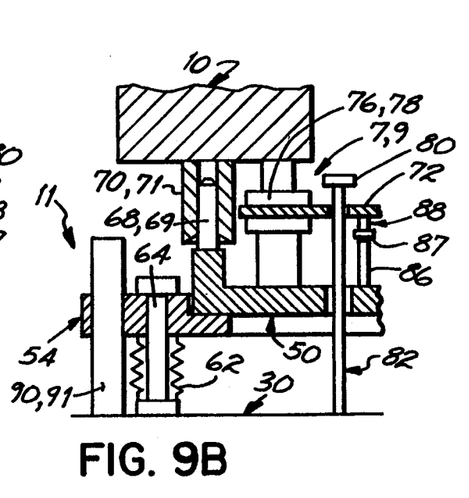
Figure 9C:
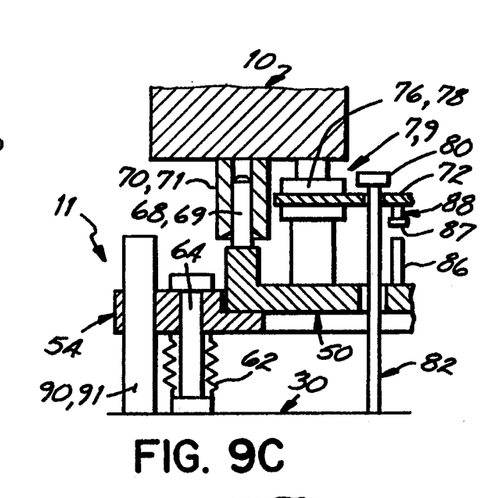

In accordance with the standard operation of a self-locking, quick disconnect coupling, when the pallet moves the male coupling members into engagement with the female coupling members as illustrated in FIG. 9B, the spring loaded locking collars 76, 78 are released and move vertically upward to a locking position relative to the female coupling members thereby locking the male and female coupling members together as illustrated in FIG. 9C. The yoke 72 is carried upward by the locking collars, and the proximity switch 86 detects that the reference surface 87 is no longer proximate the switch 86. The proximity switch produces a signal to a control connected to the proximity switch indicating that the reference surface 87 is not present which means that the locking collars 76, 78 attached to the yoke 72 are in their locked position. Therefore, the fluid paths between the rotating table 30 and the pallet 10 are connected. At this point, the control is able to regulate the flow of fluid through the couplings.

Figure 9D:
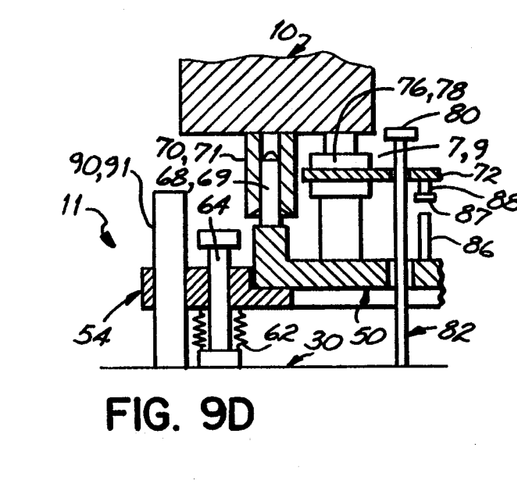

After the couplings are made, the pallet 10 continues its downward travel until it is located and engaged with the rotating table 30. During this motion, the male and female coupling members, their respective locking collars, the yoke, the alignment pins and mating guides, the alignment block and sliding block all move together relative to the rotating table 30 thereby compressing the support springs 62 as shown in FIG. 9D.

When the pallet is engaged on the rotating table, the operator is able to release the clamps and remove machined parts from the pallet or fixtures on the pallet. Further, unmachined parts may be loaded and the clamps operated to secure the parts to the pallet. It should be noted that with the fluid paths being located in a center-hole through the pallet 10, the rotating table 30 and the pallet support 32, the pallet may be rotated without disengaging the fluid couplings. Consequently, the operator may rotate the pallet to unload and load parts from all four pallet faces without having to disconnect the fluid coupling. That permits the part exchange to be performed in the shortest possible time. While rotation of the pallet and rotating table through a single full revolution may be executed without damage to the flexible lines supplying the fluid, a practical limit on rotation is desirable. If the operation of the rotating table is subject to machine control, such rotational limits are typically controlled by the machine control system. However, if the rotating table is designed for manual rotation, a mechanical stop is shown in FIG. 8 in which a stop bar 94 operates with stop dog 95 and positive steps 96 and 97 to limit rotation of the table 30 to 370°.

Figure 9E:
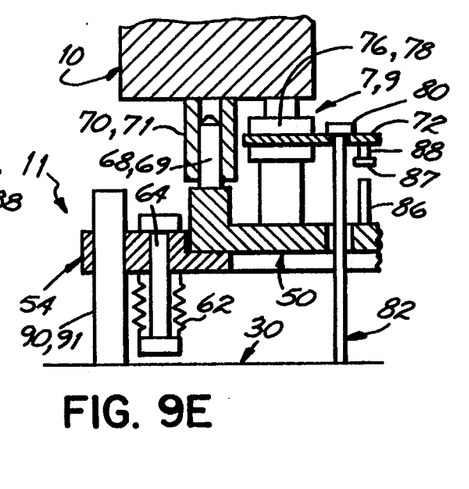
Figure 9F:
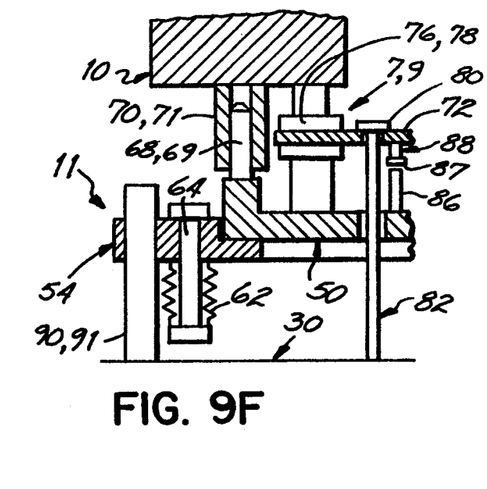

When the part exchange and work on the pallet is completed, the pallet is then moved from the load station to a machining station. In that process, the pallet 10 moves vertically upward from the rotating table 30. In that motion, since the coupling members are still locked in engagement, the upward vertical motion of the pallet 10 moves the entire automatic coupler assembly with it. That motion first allows the springs 62 to decompress and continues until the yoke 72 contacts the yoke stop 80 as shown in FIG. 9E. At this point, the yoke stop 80 prevents any further vertically upward motion of the yoke 72. Therefore, the male coupling members 12, 13 and female coupling members 34, 36 continue to move together in the vertically upward direction relative to the stationary locking collars 76, 78. In accordance with the normal operation of a self-locking, quick disconnect coupling, that motion continues until the female coupling members, moving against their internal biasing springs, reach a release position with respect to their locking collars as shown in FIG. 9F. When the release position is reached, the male and female coupling members are released, or unlocked; and the locking collars are latched with respect to the female coupling members under a bias exerted by the internal springs. The release position is detected by the proximity switch 86 detecting the presence of the reference surface 87.

Thereafter, the pallet 10 continues its vertically upward motion carrying the male coupling members and the aligning guides until it reaches the fully up position shown in FIG. 9A. Disengagement of the coupling members allows the female coupling members, aligning pins 68 and 69, aligning block 50 and sliding block 54 to fall back to their rest positions where the sliding block is biased to a predetermined position relative to the rotating table 10 by the springs 62. That position is also shown in FIG. 9A. The detection by the proximity sensor 86 of the reference surface 87 indicating that the locking collar is in the release position tells the control to inhibit the flow of fluid from the source.

Being located on the outside of the pallet, prior automatic couplers exposed the coupling members to environmental contamination such as machining chips, etc. The center location of the automatic coupler of the present invention minimizes the opportunity for contamination. However, during periods of pallet exchange, the coupling on the pallet and rotating table are exposed to the potential for contamination. Obviously any machining chips or other dirt that lodges in or on the coupling members will adversely affect operation either by damaging coupling surfaces, binding coupling operation or entering the fluid paths and damaging other fluid operated equipment. To minimize the potential for contaminants to lodge in or on the coupling members, pressurized air is directed toward the female coupling members during the full time that the couplings are disengaged and exposed to contamination. Each of the female couplings has its own air nozzle, one of which is shown in FIG. 5. Air nozzle 98 is mounted in the rotating table 30 and positioned adjacent the open ends of the female coupling member 34. In addition, another air nozzle 99 is positioned on the alignment block 50 to direct a flow of air toward the male coupling members when they are in the proximity of the rotating table 30.

The automatic fluid coupler has been described with reference to a pallet and rotating table which requires a vertical orientation of the automatic fluid coupler. While certain elements of the automatic coupler are moved by gravity to a desired location, for example the sliding block 54 after coupling disengagement, the coupling may also be used in other applications that do not have a vertical orientation. It is well within the skill of the an to provide biasing mechanisms that would provide the same function as the gravitational force operating on the automatic coupler. The automatic fluid coupler of the disclosed embodiment illustrates a pair of self-locking quick disconnect couplings, however, the claimed invention is equally applicable to an application utilizing a single coupling. The automatic fluid coupler of the present invention is an entirely passive mechanism, that is, a mechanism that has no actuators or other external devices which are used to engage or disengage the self-locking, quick disconnect coupling mechanism. The mechanism is engaged and subsequently disengaged exclusively by the motion of the male coupling member being carried by the pallet.

While the invention has been illustrated in some detail according to the preferred embodiments shown in the accompanying drawings, and while the preferred embodiments have been described in some detail, there is no intention to thus limit the invention to such detail. On the contrary, it is intended to cover all modifications, alterations, and equivalents falling within the spirit and scope of the appended claims.

What is claimed is:

1. An apparatus for connecting and disconnecting a coupling between two machine elements movable with respect to each other in a first direction and a second direction opposite the first direction, the apparatus comprising:
   a first block operatively mounted on one of the machine elements and movable in the first and second directions with respect to the one of the machine elements;
   a quick disconnect coupling having
      a first coupling member having one end operatively mounted on another of the machine elements,
      a second coupling member having one end connected to the first block, and
      a locking collar slidably mounted on said second coupling member and moving to a locking position in response to the machine elements providing relative motion between said coupling members in the first direction to move said coupling members toward and into engagement with each other and said locking collar in the locking position, thereby connecting and locking together the quick disconnect coupling;
   yoke means connected to said locking collar for following the motion of said locking collar; and
   yoke stop means operatively mounted on the one of the machine elements and disposed with respect to said yoke means for blocking motion of said yoke means and said locking collar in response to the machine elements providing relative motion between said coupling members to move said coupling members in the second direction, thereby disconnecting the quick disconnect coupling.

2. The apparatus of claim 1 wherein said yoke stop means further comprises a stop block connected to the one of the machine elements proximate said yoke means whereby said yoke means moves into contact with said stop block in response to said first and second coupling members moving in the second direction.

3. The apparatus of claim 2 wherein said yoke stop means further comprises a stop shaft having one end connected to the one of the machine elements and an opposite end connected to the said stop block.

4. The apparatus of claim 2 wherein the apparatus further comprises guide members connected to the one of the machine elements and slidably coupled to said first block for guiding translation of said first block in said first and second directions with respect to the one of the machine elements.

5. The apparatus of claim 4 wherein the apparatus further comprises spring members located between the one of the machine elements and said first block, said spring members biasing said first block to a predetermined position with respect to the one of the machine elements.

6. The apparatus of claim 5 wherein the apparatus further comprises means operatively connected to said guide members for adjusting said predetermined position of said first block.

7. The apparatus of claim 4 wherein the apparatus further comprises an aligning pin and a mating aligning pin guide operatively connected between said first block and the one of the machine elements.

8. The apparatus of claim 7 wherein said aligning pin is connected to said aligning block and said mating aligning pin guide is connected to the one of the machine elements.

9. The apparatus of claim 4 wherein the apparatus further comprises a proximity sensor operably connected between said yoke means and said first block for detecting a position of said locking collar.

10. The apparatus of claim 9 wherein said proximity sensor further comprises a reference surface on said yoke means and a proximity switch connected to said first block opposite from said reference surface to detect a position of said locking collar with respect to the second coupling member.

11. The apparatus of claim 7 wherein the first block comprises:
   a sliding block slidably coupled to the guide members; and
   an aligning block mounted within the sliding block and movable with respect to the sliding block in directions approximately perpendicular to the first and the second directions.

12. An apparatus for connecting and disconnecting a coupling between two machine elements movable with respect to each other in a first direction and a second direction opposite the first direction, the apparatus comprising:
   a first block operatively mounted on one of the machine elements and movable in the first and second directions with respect to the one of the machine elements;
   a self-locking, quick disconnect coupling including a first coupling member having one end operatively mounted on another of the machine elements and a second coupling member having one end mounted on the first block, said second coupling member having a slidable locking collar moving to a locking position in response to the machine elements providing relative motion between said coupling members in the first direction to move said coupling members toward and into engagement with each other and said locking collar in the locking position, thereby connecting and locking together the self-locking, quick disconnect coupling;
   a yoke connected to the locking collar; and
   a yoke stop operatively mounted on the one of the machine elements and disposed with respect to said yoke for controlling motion of the yoke and locking collar relative to the coupling members, said yoke stop permitting said yoke and locking collar to move in response to the machine elements providing relative motion between coupling members in the first direction to move said coupling members into engagement with each other, thereby connecting the fluid coupling, and said yoke stop blocking motion of said yoke and locking collar in response to the machine elements providing relative motion between said coupling members to move said coupling members in the second direction, whereby said coupling members move relative to said locking collar, thereby disconnecting said coupling.

13. An apparatus for connecting and disconnecting fluid couplings between an upper side of a rotating table and a lower side of a moveable pallet, the rotating table being rotatably coupled to a stationary base, and the moveable pallet being moveable in a first direction moving the lower side of the moveable pallet toward the upper side of the rotating table, and in a second direction opposite the first direction; the apparatus comprising:
   a first block operatively mounted on the upper surface of the rotating table and moveable in the first and second directions with respect to the rotating table;
   a pair of self-locking, quick disconnect fluid couplings, including
   a pair of male coupling members having one end connected to the lower surface of the moveable pallet,
   a pair of female coupling members having ends connected to the first block, and
   a pair of sliding locking collars, each of the sliding locking collars slidably mounted on one of the female coupling members and moving to a first position in response to the moveable pallet moving the male coupling member in the first direction toward and into engagement with the female coupling member, thereby connecting and locking together the self-locking, quick disconnect fluid coupling;
   a yoke connected to the pair of sliding locking collars; and
   a yoke stop connected to the rotating table and disposed with respect to the yoke for blocking motion of the yoke and the pair of locking collars in response to the moveable pallet moving the pair of male coupling members in the second direction whereby the pair of sliding male coupling members and the pair of female coupling members move in the second direction relative to the pair of locking collars, thereby disconnecting the pair of self-locking, quick disconnect fluid couplings.

* * * * *